United States Patent
Sadakuni

(10) Patent No.: US 10,084,935 B1
(45) Date of Patent: Sep. 25, 2018

(54) IMAGE FORMING APPARATUS AND METHOD FOR CONTROLLING AN IMAGE FORMING APPARATUS

(71) Applicants: KABUSHIKI KAISHA TOSHIBA, Tokyo (JP); TOSHIBA TEC KABUSHIKI KAISHA, Tokyo (JP)

(72) Inventor: Takayuki Sadakuni, Numazu Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/939,897

(22) Filed: Mar. 29, 2018

Related U.S. Application Data

(63) Continuation of application No. 15/447,002, filed on Mar. 1, 2017, now Pat. No. 9,948,822.

(51) Int. Cl.
  *G06F 3/12* (2006.01)
  *H04N 1/327* (2006.01)
  *H04N 1/00* (2006.01)

(52) U.S. Cl.
  CPC ..... *H04N 1/32769* (2013.01); *H04N 1/00021* (2013.01); *H04N 1/00037* (2013.01); *H04N 1/00082* (2013.01); *H04N 1/00697* (2013.01); *H04N 2201/0094* (2013.01); *H04N 2201/3253* (2013.01)

(58) Field of Classification Search
  CPC ........... H04N 1/32769; H04N 1/00021; H04N 1/00037; H04N 1/00082; H04N 1/00697; H04N 2201/0094; H04N 2201/3253
  See application file for complete search history.

(56) References Cited

U.S. PATENT DOCUMENTS

| | | | | |
|---|---|---|---|---|
| 2002/0054330 A1* | 5/2002 | Jinbo | ..................... | G06F 3/1221 358/1.15 |
| 2002/0089694 A1* | 7/2002 | Idehara | .............. | G03G 15/2003 358/1.15 |
| 2002/0115451 A1* | 8/2002 | Taniguchi | .......... | H04N 1/00127 455/456.5 |
| 2008/0007767 A1 | 1/2008 | Ishimaru | | |
| 2008/0170256 A1* | 7/2008 | Matsuhara | ............ | G06F 3/1207 358/1.15 |
| 2009/0033984 A1* | 2/2009 | Sahashi | ................. | G06F 21/608 358/1.15 |
| 2010/0245886 A1* | 9/2010 | Okajima | ............... | G06F 21/608 358/1.15 |
| 2014/0240756 A1* | 8/2014 | Ganesan | ............... | H04W 4/029 358/1.15 |
| 2016/0011833 A1 | 1/2016 | Takayanagi | | |
| 2016/0224284 A1* | 8/2016 | Fernandes | ............. | G06F 3/1231 |
| 2017/0126671 A1* | 5/2017 | Haapanen | ............ | H04B 17/318 |

FOREIGN PATENT DOCUMENTS

JP 2016-159552 A 9/2016

\* cited by examiner

*Primary Examiner* — Moustapha Diaby
(74) *Attorney, Agent, or Firm* — Patterson & Sheridan, LLP

(57) ABSTRACT

An image forming apparatus includes a detection section that detects a distance between the image forming apparatus and a portable terminal, and a controller. The controller determines whether the distance meets a predetermined condition, and controls operations relating to an image forming job if the detected distance meets the predetermined condition.

18 Claims, 3 Drawing Sheets

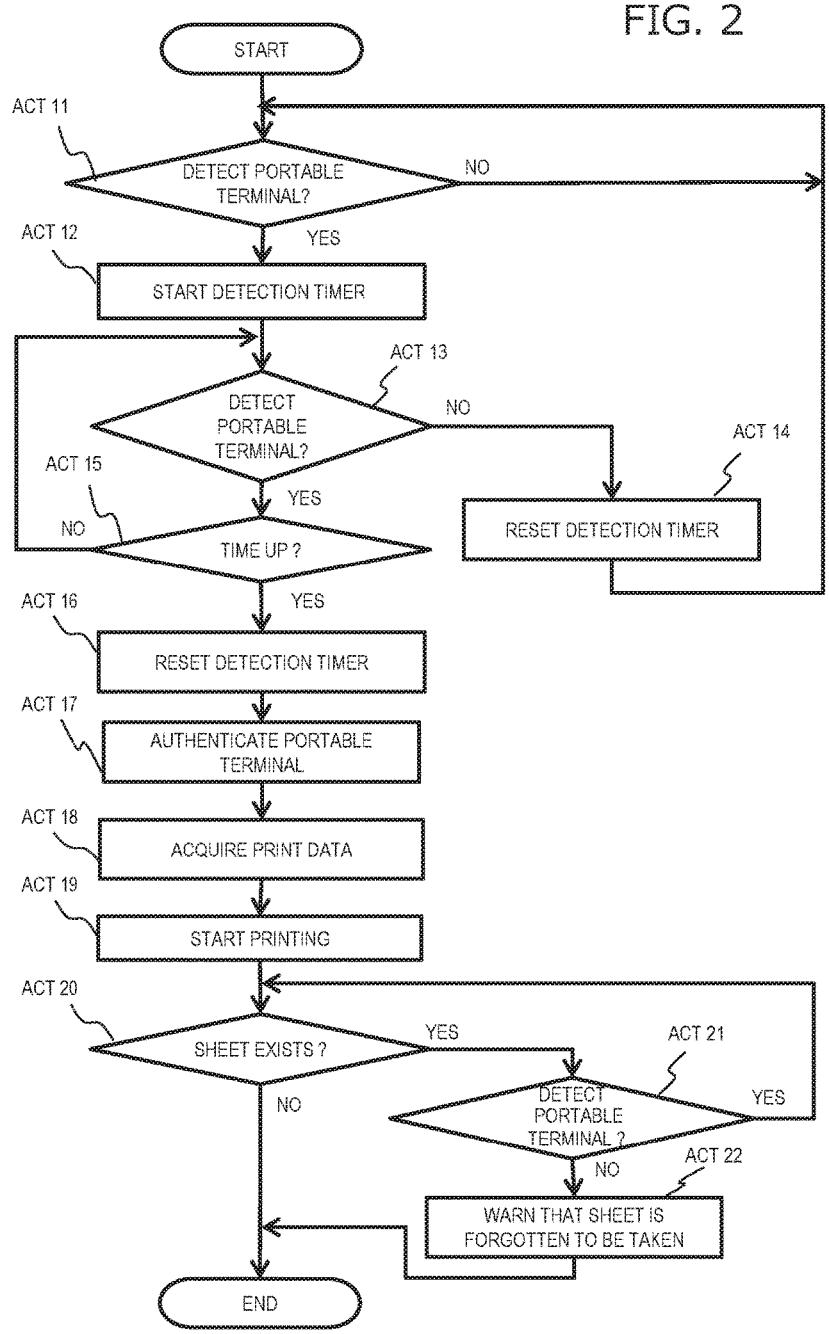

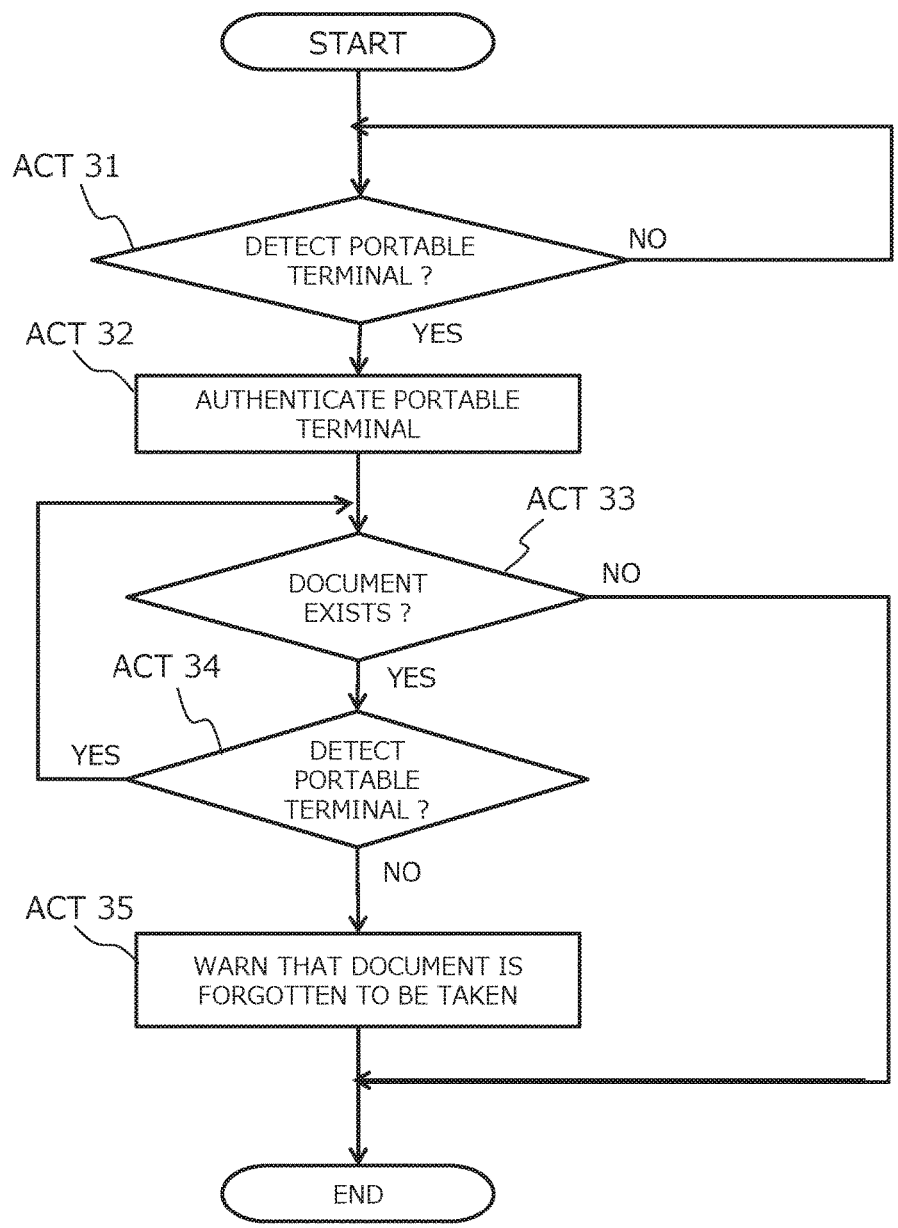

IMAGE FORMING APPARATUS AND METHOD FOR CONTROLLING AN IMAGE FORMING APPARATUS

CROSS-REFERENCE TO RELATED APPLICATION

This application is a continuation of U.S. patent application Ser. No. 15/447,002, filed on Mar. 1, 2017, the entire contents of each of which are incorporated herein by reference.

FIELD

Embodiments described herein relate generally to an image forming apparatus and a method for controlling an image forming apparatus.

BACKGROUND

Conventionally, in an image forming apparatus which is an MFP (Multifunction Peripheral) or a printer, a hold print function and a private print function (hereinafter, referred to as "hold print and the like function") can be carried out to prevent a printed sheet from being forgotten by the person requesting printing thereof and inadvertently be left on the MFP. When the MFP performs the hold print and the like function, the MFP temporarily stores document data to be printed in a storage device of the MFP, and displays the document stored in an operation display section of the MFP in a user-selectable manner. By operation of a display operation section of the MFP, a user can print, and thus receive, the printed document while present at the MFP.

However, after the MFP starts printing as a result of a user operation of the display section, if the number of the sheets to be printed is large, there is a possibility that the user will temporarily leave the MFP and then forget to return to take the printed sheets.

Further, when the MFP includes a scanner, there is a case in which the document read by the scanner is left on the platen for reading the document or at a sheet discharge section of an ADF (Automatic document feeder).

DESCRIPTION OF THE DRAWINGS

FIG. 2 is a flowchart illustrating an example of operations of an image forming apparatus according to a first embodiment; and FIG. 3 is a flowchart illustrating an example of operations of an image forming apparatus according to a second embodiment.

DETAILED DESCRIPTION

Figure 1:
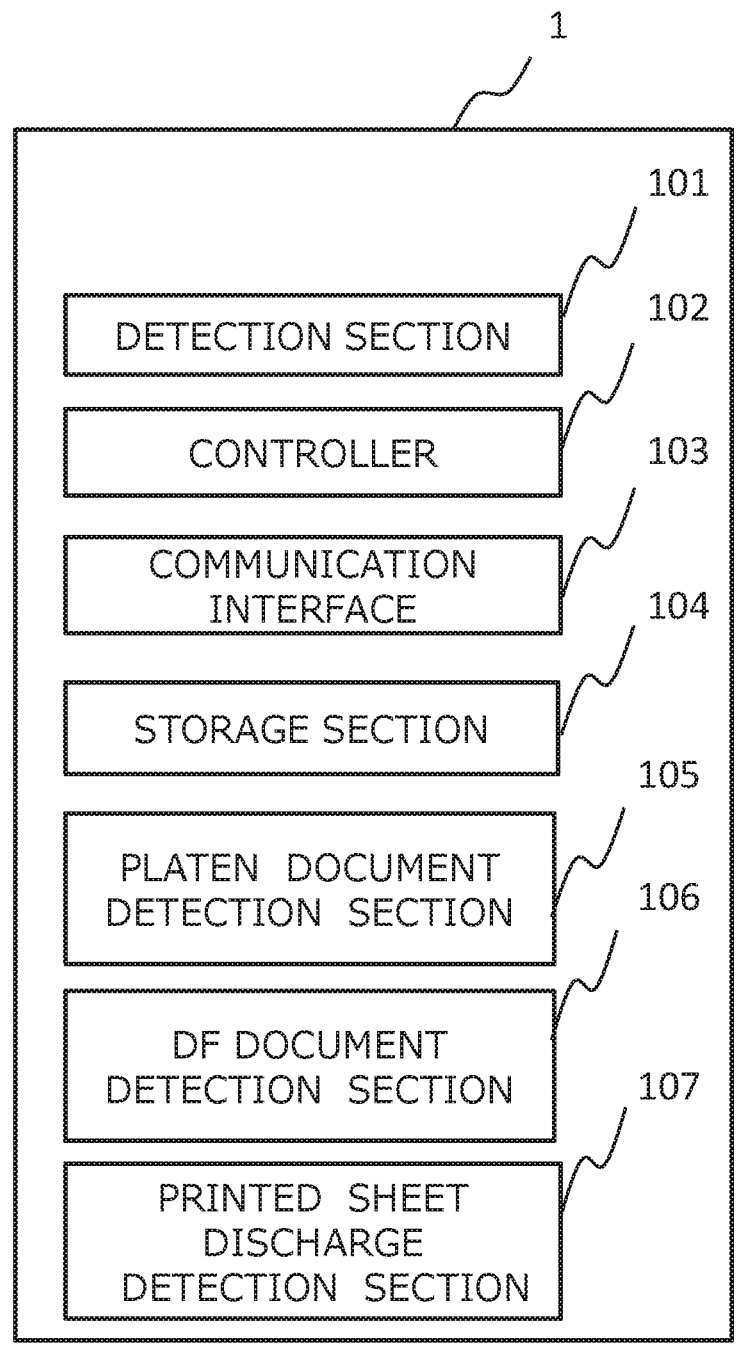
FIG. 1 is a diagram illustrating an example of the software configuration of an image forming apparatus according to an embodiment.

In accordance with an image forming apparatus of an embodiment, a detection section detects a distance between the image forming apparatus and a portable terminal. A controller controls operations relating to an image forming job if the detected distance meets a predetermined condition.

Hereinafter, embodiments of an image forming apparatus and a method of controlling an image forming apparatus are described with reference to the accompanying drawings. Furthermore, the same reference numbers are used for the same elements in each drawing.

FIG. 1 is a diagram illustrating an example of the software configuration of the image forming apparatus according to an embodiment. In FIG. 1, the image forming apparatus 1 includes functions of a detection section 101, a controller 102, a communication interface 103, a storage section 104, a platen document detection section 105, a DF (document feeder) document detection section 106 and a printed sheet discharge detection section 107.

A controller 102 such as a CPU executes a control program stored in a RAM, ROM, or HDD to control the image forming apparatus, and in this way, the above functions of the image forming apparatus 1 are performed. The control program is acquired from a recording medium or from a server or the like via a network. The image forming apparatus also includes a printer, a sheet feeding unit and a sheet conveying unit. The sheet feeding unit feeds a sheet to the printer. The printer prints an image on the sheet. The sheet conveying unit conveys the sheet along a conveying path. The sheet conveying unit may include conveying rollers and conveying belts.

The detection section 101 detects the distance between the image forming apparatus and a portable terminal (not shown). The portable terminal is a terminal device such as a notebook PC, a tablet PC, a smart phone or a smart watch which is rendered portable by a user. Furthermore, the portable terminal in the present embodiment may be carried (moved along with the movement of the user) by the user at the time the image forming apparatus is used. Thus, for example, the portable terminal may be a terminal that can be worn by the user, such as a smart watch.

In one implementation hereof, the detection section 101 detects the distance between the portable terminal and the image forming apparatus by acquiring distance information (the distance between the portable terminal and the MFP) measured using, for example, a GPS (Global Positioning System) function of the portable terminal using wireless communication. The portable terminal can acquire its own position (longitude and latitude and elevation) as a result of receiving transmissions from a GPS satellite. Furthermore, the detection section 101 obtains the location of the image forming apparatus prior to determining whether or not to immediately perform a print request.

The detection section 101 may in one aspect detect the distance between the portable terminal and the MFP by acquiring distance information measured using a wireless beacon via a wireless communication protocol. The wireless beacon is used to, for example, measure the position of the portable terminal, in part by determining a signal representative of a plurality of possible or likely location positions of the wireless terminal in a building in advance. By using one wireless beacon, the distance between the wireless beacon and the portable terminal is determined, for example, by comparing signal strength detected by the portable terminal to signal strength detected and recorded in advance at the plurality of arrangement positions. By using two or more wireless beacons, the position of the portable terminal is determined.

The detection section 101 may, in another aspect, detect the distance between the image forming apparatus and the portable terminal by executing wireless communication such as a near field wireless communication system with the portable terminal. In the present embodiment, a case in which the detection section 101 detects the distance by detecting whether or not the portable terminal is within the detection range of a near field wireless communication system is exemplified. The detection range of the near field wireless communication system can be set to a predetermined distance from the image forming apparatus by adjusting the strength of a wireless output, for example. The detection section 101 can detect the distance between the image forming apparatus and the portable terminal merely by detecting the presence of the portable terminal in the range of the wireless communication system. The detection section 101 can determine that the portable terminal is approaching the image forming apparatus 1 when the portable terminal is detected by the wireless communication system. The detection section 101 can determine that the portable terminal is away from the image forming apparatus 1, for example it is outside of the detection range of the detection section 101, when the portable terminal is not detected by the wireless communication system. In a case in which the user walks at the same speed, it is possible to presumptively determine, by calculation, a rough distance between the image forming apparatus and the portable terminal based on the time elapsed from the moment the portable terminal was detected by the wireless communication system.

The controller 102 controls an operation relating to an image forming job, for example starts printing the print job, when the distance between the image forming apparatus and the portable terminal detected by the detection section 101 meets a predetermined condition. The distance between the image forming apparatus and the portable terminal meets the predetermined condition means, for example, a case in which a predetermined time has elapsed since the portable terminal has entered the detection range of the near field wireless communication system. The controller 102 may also control an operation relating to an image forming job, such as starting the print job, in a case in which the portable terminal is out of the detection range of the near field wireless.

The image forming apparatus executes an image forming job to print an image on one or more sheets. The image forming job is, for example, a copy job, a print job, a scan job, a FAX job and the like. The image forming job in the present embodiment includes printing, together with discharging of the printed document or printed sheet. An operation relating to the job is, for example, execution of the job, an operation after the job is executed, or the like. In the present embodiment, as the operation relating to the job, the execution of the print job is described. As an operation relating to the job, a warning of the presence of a sheet that has been left behind on the printing apparatus after the print job is executed is described. As an operation relating to the job, a warning of the presence of the document that is left behind by the user after a scan job is executed is also described.

The communication interface 103 carries out wireless communication with the portable terminal. The communication interface 103 carries out, for example, near field wireless communication with the portable terminal. Furthermore, the function of the communication interface 103 may be executed as a part of functions of the detection section 101.

The storage section 104 stores print data associated with the portable terminal. The storage section 104 may be at least one of a RAM, a HDD and an SSD. The print data associated with the portable terminal is, for example, print data associated with identification information of the portable terminal. For example, for a private print, a password is set for document data to be printed and the password is input by a user into an operation display section of the image forming apparatus 1. In the present embodiment, the identification information of the portable terminal and the print data can be associated with each other by inputting the identification information of the portable terminal instead of the password.

The platen document detection section 105 detects a document a user has forgotten to take from the platen (a DF event) by detecting opening and closing of the platen cover. The DF document detection section 106 detects a document a user has forgotten to take from the platen using a sensor arranged at a document discharging port of a document feeder. The printed sheet discharge detection section 107 detects a printed sheet forgotten by a user. The platen document detection section 105, the DF document detection section 106 or the printed sheet discharge detection section 107 may be, for example, a mechanical limit switch or an infrared sensor for detecting the presence of a sheet.

First Embodiment

FIG. 2 is a flowchart illustrating an example of operations of the image forming apparatus according to the first embodiment. Specifically, the controller 102 performs the processing described in FIG. 2.

The first embodiment is a case in which the print job is executed in response to a user approaching the portable terminal. In the first embodiment, a message statement concerning the presence of the printed sheet that is left behind after the print job is executed is set forth. Furthermore, the print job can include a password based on the identification information of the portable terminal, which may be set in advance using other terminals or devices (not shown) and then the print job is sent to the image forming apparatus 1. The print job is stored in the storage section 104.

In FIG. 2, the controller 102 determines whether or not the portable terminal is detected (ACT 11by entering the communication range of the near field wireless.

If the controller 102 determines that the portable terminal is not detected (No in ACT 11), the controller 102 repeats the processing in ACT 11 and waits until the portable terminal is detected.

On the other hand, if controller 102 determines that the portable terminal is detected (Yes in ACT 11), the controller 102 starts a detection timer (ACT 12). After the processing in ACT 12 is executed, the controller 102 determines whether or not the portable terminal is detected (ACT 13). If the controller 102 determines that the portable terminal is not detected (No in ACT 13), the controller 102 resets the detection timer (ACT 14) to 0. After the processing in ACT is executed, the controller 102 again executes the processing beginning at ACT 11.

On the other hand, if the controller 102 determines that the portable terminal is detected (Yes in ACT 13), the controller 102 determines whether or not the detection timer times out (ACT 15). If the controller 102 determines that the detection timer does not time out (No in ACT 15), the controller 102 executes the processing in ACT 13. On the other hand, if the controller 102 determines that the detection timer times out (Yes in ACT 15), the controller 102 resets the detection timer (ACT 16) to 0.

If the portable terminal is close to the edge of the detectable range of the wireless communication system, accurately detecting the presence of the portable terminal being in the range is difficult. The detection timer counts out that the portable terminal is detected for a predetermined period or more. In this way, the presence of the portable terminal is steadily detected can be confirmed. When the portable terminal is detected for a predetermined period or more after the portable terminal is initially detected, it can be predicted by the controller 102 that the portable terminal is close to the image forming apparatus 1. For example, in a case in which the detection distance of the portable terminal is 10 m, and the user walks at a speed of 1 m per second, it can be predicted that the user moves to a distance 5 m away from the image forming apparatus 1 after 5 seconds have passed since the detection of the portable terminal. The image forming apparatus 1 can thus set execution timing of the job described later using the detection timer.

After the processing in ACT 16 is executed, the controller 102 authenticates the portable terminal (ACT 17). The authentication of the portable terminal is a process of determining that the portable terminal is a terminal of a regular user of the image forming apparatus 1. The controller 102 acquires the identification information from the portable terminal to determine whether or not the identification information is registered for use with the image forming apparatus 1.

After the processing in ACT 17 is executed, the controller 102 acquires the print data by retrieving the print data containing the authenticated identification information from the print data stored in the storage section 104. In the case the controller 102 determines that data corresponding to the print data stored in the storage section 104 does not exist, the controller 102 interrupts the processing shown in FIG. 2.

After the processing in ACT 18 is executed, the controller 102 starts to print the acquired print data (ACT 19). In this way, the user can omit the operation of inputting the password from the operation display section of the image forming apparatus 1.

After the processing in ACT 19 is executed, the controller 102 determines whether or not the printed sheet is present at the image forming apparatus 1 (ACT 20). The controller 102 determines whether or not the sheet is present according to a detection result of the sensor arranged in a sheet discharge bin of the printed sheet discharge detection section 107.

If it is determined that the sheet is present (Yes in ACT 20), the image forming apparatus 1 determines whether or not the portable terminal is detected (ACT 21). If the controller 102 determines that the portable terminal is detected (Yes in ACT 21), the controller 102 returns to the processing in ACT 20 and waits for until the sheet is removed.

On the other hand, if it is determined that the portable terminal is not detected (No in ACT 21), the controller 102 sends out a warning that the printed sheet has been forgotten at the image forming apparatus 1 to the portable terminal (ACT 22). In other words, the controller 102 controls the communication interface 103 to send the notification, that the sheet remains on the sheet discharge bin, to the portable terminal. The warning of the of presence of the sheet that was forgotten (left behind) is executed through, for example, causing the portable terminal to vibrate or outputting of a predetermined warning sound from the portable terminal. After the processing in ACT 22 is executed, the controller 102 terminates operation of the steps of the flowchart shown in FIG. 2.

In a case in which the portable terminal is not detected in a state in which the sheet is present on the image forming apparatus 1, there is a possibility that the user has walked away from the image forming apparatus 1 without taking the printed sheet (forgetting to take the sheet). The image forming apparatus 1 can prevent the printed sheet from being placed in the sheet discharge bin through carrying out a warning that the sheet has been forgotten to the portable terminal.

Furthermore, the warning by vibrating the portable terminal or outputting the warning sound are executable in other ways. For example, a predetermined application (app) capable of communicating with the image forming apparatus 1 may be installed in the portable terminal in advance to vibrate the portable terminal when a sheet has been left of the image forming apparatus. The controller 102 transmits a command for setting a flag in the printing processing to be ON to the application of the portable terminal together with the start of the printing in ACT 19. The image forming apparatus 1 transmits a command for setting the flag in the printing processing to be OFF at the time clearing of the sheet is detected in ACT 20. The application of the portable terminal vibrates the portable terminal if the flag in the printing processing is ON when the communication with the image forming apparatus 1 is terminated.

The image forming apparatus 1 may designate the category of the warning to the portable terminal. For example, the image forming apparatus 1 may carry out warning other than the warning of the presence of the sheet that is forgotten a case in which a jam occurs in the image forming apparatus 1.

Second Embodiment

FIG. 3 is a flowchart illustrating an example of operations of the image forming apparatus according to the second embodiment.

In the second embodiment, that the document is placed on a platen or an ADF of the image forming apparatus 1, and when forgotten after a scan job for scanning the document in the image forming apparatus 1 a warning is issued.

In FIG. 3, the image forming apparatus 1 determines whether or not the portable terminal is detected (ACT 31). The controller 102 determines whether the portable terminal is detected if the portable terminal enters the communication range in the near field wireless system similarly to the first embodiment.

If it is determined that the portable terminal is not detected (No in ACT 31), the controller 102 repeats the processing in ACT 31 and waits until the portable terminal is detected.

On the other hand, if it is determined that the portable terminal is detected (Yes in ACT 31), the controller 102 authenticates the portable terminal (ACT 32). The controller 102 acquires the identification information from the portable terminal to be capable of executing the scan job. Further, the controller 102 may display an executable job in the identification information of the portable terminal on the operation display section in a selectable manner.

After the processing in ACT 32 is executed, the controller 102 determines whether or not the document is present (ACT 33) on the platen image forming device 1. The controller 102 determines whether or not the document is present on the platen according to detection of the opening and closing of the platen cover. The controller 102 may determine whether or not the document is present according to detection of the document arranged on a contact glass. The controller 102 may determine whether the document is cleared according to the result detected by the sensor arranged at the sheet discharge port of the ADF.

If it is determined that the document is not present (No in ACT 33), the controller 102 terminates the processing shown in the flowchart shown in FIG. 3.

On the other hand, if the controller 102 determines that the document is on the platen (Yes in ACT 33), the controller 102 determines whether or not the portable terminal is detected (ACT 34). If it is determined that the portable terminal is detected (Yes in ACT 34), the controller 102 executes the processing in ACT 33 and waits until the document is not present as a result of being taken by user. On the other hand, if it is determined that the portable terminal is not detected (No in ACT 34), the controller 102 sends a warning that the document has been forgotten at the portable terminal (ACT 35). The warning that the document is forgotten is executed by, for example, vibrating the portable terminal or outputting a predetermined warning sound from the portable terminal, which is similar to the warning that a printed sheet has been forgotten.

In a case in which the portable terminal is not detected in a state in which the document is present on the platen or sheet feeder, there is a possibility that the user has moved away from the image forming apparatus 1 without taking the scanned document (forgotten to take the document). The image forming apparatus 1 can prevent that the document is placed in an output tray of the image forming apparatus 1 by carrying out warning that the document is forgotten to the portable terminal.

Further, the method executing vibrating the portable terminal or outputting the warning sound may be different, which is similar to the first embodiment.

In the present embodiment, the method for detecting the distance between the image forming apparatus and the portable terminal by the detection section 101 described in FIG. 1 is optional. In the foregoing first embodiment and second embodiment, a case in which the detection section 101 detects the distance between the image forming apparatus and the portable terminal through a detection and non-detection method in the near field wireless is described. The detection distance of the near filed wireless is from several cm to dozens of m. Thus, the near field wireless is used in the control in a case in which the portable terminal is close to or away from the image forming apparatus 1 on the same floor.

On the other hand, in a case in which the GPS function of the portable terminal is used, the detection of the distance in a building is difficult. However, for example, the GPS function is applied in a case of approaching a building in which the image forming apparatus is arranged from an office several km away.

The near field wireless of the portable terminal which can execute communication through touching a card reader is applied in a case in which a plurality of the image forming apparatuses are closely arranged.

According to at least one embodiment described above, in the image forming apparatus, the detection section detects the distance between the image forming apparatus and the portable terminal. The controller controls the operation relating to the image forming job if the detected distance meets the predetermined condition.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
   a communication interface configured to wirelessly communicate with a portable terminal via near-field communication;
   a sheet detection section configured to detect a sheet positioned at a predetermined position on the image forming apparatus;
   a storage section configured to store print data associated with the portable terminal;
   a controller configured to:
      determine whether or not the portable terminal is within a range for the near-field communication,
      if the portable terminal is determined to be within the range for the near-field communication, control printing of the stored print data associated with the portable terminal,
      if the sheet detection section detects the sheet positioned at the predetermined position after the stored print data is printed, control the communication interface to communicate, to the portable terminal, a command for setting a flag associated with the image forming job to be ON,
      if the sheet detection section does not detect the sheet positioned at the predetermined position after the stored print data is printed, control the communication interface to communicate, to the portable terminal, a command for setting the flag associated with the image forming job to be OFF, wherein
   if the flag in the image forming job is ON and if the portable terminal is not within the range for the near-field communication, an application on the portable terminal outputs a notification indicating that the sheet has been left at the predetermined position.

2. The image forming apparatus according to claim 1, wherein the sheet detection section is a sensor arranged at a sheet discharge port of the image forming apparatus.

3. The image forming apparatus according to claim 1, wherein the sheet detection section is a sensor arranged at a document discharge port of the image forming apparatus.

4. The image forming apparatus according to claim 1, wherein the sheet detection section is a sensor that detects an opening and closing of a platen cover of the image forming apparatus.

5. The image forming apparatus according to claim 1, wherein the sheet detection section is a mechanical switch.

6. The image forming apparatus according to claim 1, wherein the sheet detection section is an infrared sensor.

7. The image forming apparatus according to claim 1, wherein the storage section stores the print data with identification information associated with the terminal.

8. The image forming apparatus according to claim 7, wherein:
   the controller is further configured to, if the portable terminal is determined to be within the range for the near-field communication, control the communication interface to acquire identification information from the portable terminal and determine whether the acquired identification information corresponds to the stored identification information that is stored in association with the stored print data, and
   if the acquired identification information does not correspond to the stored identification information that is stored in association with the stored print data, the controller controls processing so that the stored print data is not printed.

9. The image forming apparatus according to claim 8, wherein
the controller is further configured to, if the portable terminal is determined to be within the range for the near-field communication and before the identification information is acquired from the portable terminal, determine whether the portable terminal is within the range for the near-field communication continuously for longer than a predetermined time, and
if the portable terminal is within the range for the near-field communication continuously for longer than the predetermined time, the controller controls the communication interface to acquire the identification information.

10. A method of controlling an image forming apparatus, comprising:
storing print data associated with a portable terminal in a storage device of the image forming apparatus;
determining whether or not the portable terminal is within a range for wireless near-field communication with the image forming apparatus;
if the portable terminal is determined to be within the range for the near-field communication, printing the stored print data associated with the portable terminal;
after the print data is printed, determining whether a sheet remains positioned at a predetermined position on the image forming apparatus;
if the sheet remains positioned at the predetermined position after the stored print data is printed, communicating to the portable terminal via the near-field communication, a command for setting a flag associated with the image forming job to be ON; and
if the sheet does not remain positioned at the predetermined position after the stored print data is printed, communicating, to the portable terminal via the near-field communication, a command for setting the flag associated with the image forming job to be OFF, wherein
if the flag in the image forming job is ON and if the portable terminal is not within the range for the near-field communication, an application on the portable terminal outputs a notification indicating that the sheet has been left at the predetermined position.

11. The method according to claim 10, wherein whether the sheet remains positioned at the predetermined position is determined according to a sensor arranged at a sheet discharge port of the image forming apparatus.

12. The method according to claim 10, wherein whether the sheet remains positioned at the predetermined position is determined according to a sensor arranged at a document discharge port of the image forming apparatus.

13. The method according to claim 10, wherein whether the sheet remains positioned at the predetermined position is determined according to a sensor that detects an opening and closing of a platen cover of the image forming apparatus.

14. The method according to claim 10, wherein whether the sheet remains positioned at the predetermined position is determined according to a state of a mechanical switch.

15. The method according to claim 10, wherein whether the sheet remains positioned at the predetermined position is determined according to a state of an infrared sensor.

16. The method according to claim 10, wherein the print data is stored with identification information associated with the terminal.

17. The method according to claim 16, further comprising:
if the portable terminal is determined to be within the range for the near-field communication, acquiring identification information from the portable terminal via the near-field communication; and
determining whether the acquired identification information corresponds to the stored identification information that is stored in association with the stored print data, wherein
if the acquired identification information does not correspond to the stored identification information that is stored in association with the stored print data, the stored print data is not printed.

18. The method according to claim 17, further comprising:
if the portable terminal is determined to be within the range for the near-field communication and before the identification information is acquired from the portable terminal, determining whether the portable terminal is within the range for the near-field communication continuously for longer than a predetermined time.

* * * * *